June 24, 1930.　　　F. C. THOMPSON　　　1,766,414
CHANGE SPEED DEVICE
Filed May 12, 1925　　　3 Sheets-Sheet 2

Inventor:
Fred C. Thompson
by Synnestvedt & Lechner
Attorneys.

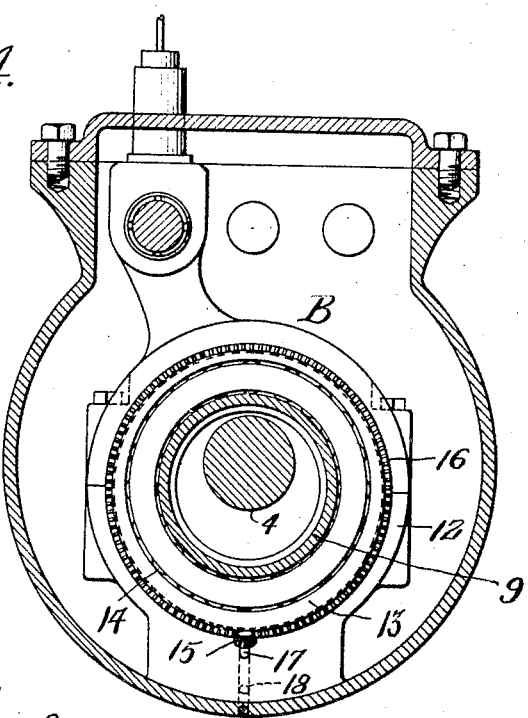
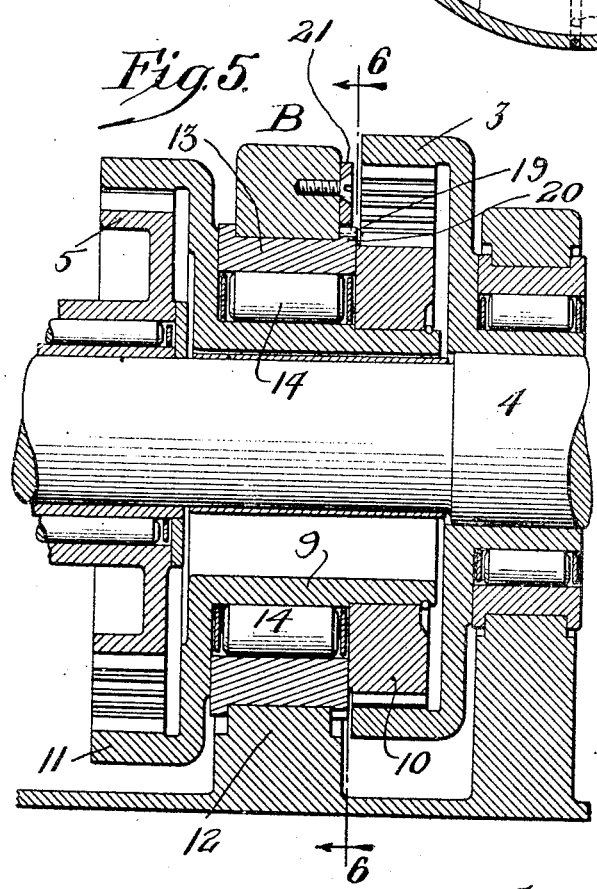
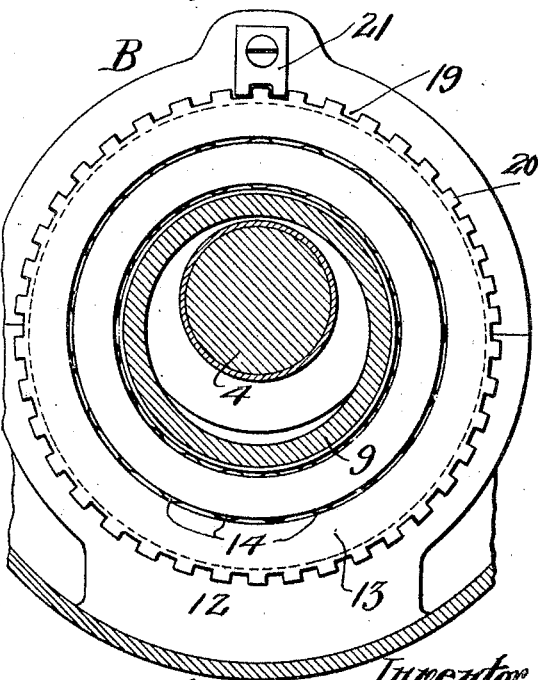

Patented June 24, 1930

1,766,414

UNITED STATES PATENT OFFICE

FRED C. THOMPSON, OF DETROIT, MICHIGAN, ASSIGNOR TO MORSE CHAIN COMPANY, A CORPORATION OF NEW YORK

CHANGE-SPEED DEVICE

Application filed May 12, 1925. Serial No. 29,697.

This invention relates to improvements in change speed devices and is especially useful in connection with those employing internal gears and pinions.

One of the primary objects of my invention is the provision of a change speed device in which the gears may be made to effectively mesh through the employment of a simple, inexpensive and conveniently arranged adjusting mechanism, this for the reason that in such devices the gears may not mesh properly in the first instance because of imperfect alignment and may not mesh properly later because of wear.

Another object of my invention is the provision of a change speed device in which proper meshing relations of the change speed gearing may be maintained by operation of a single adjusting member.

Figure 1:
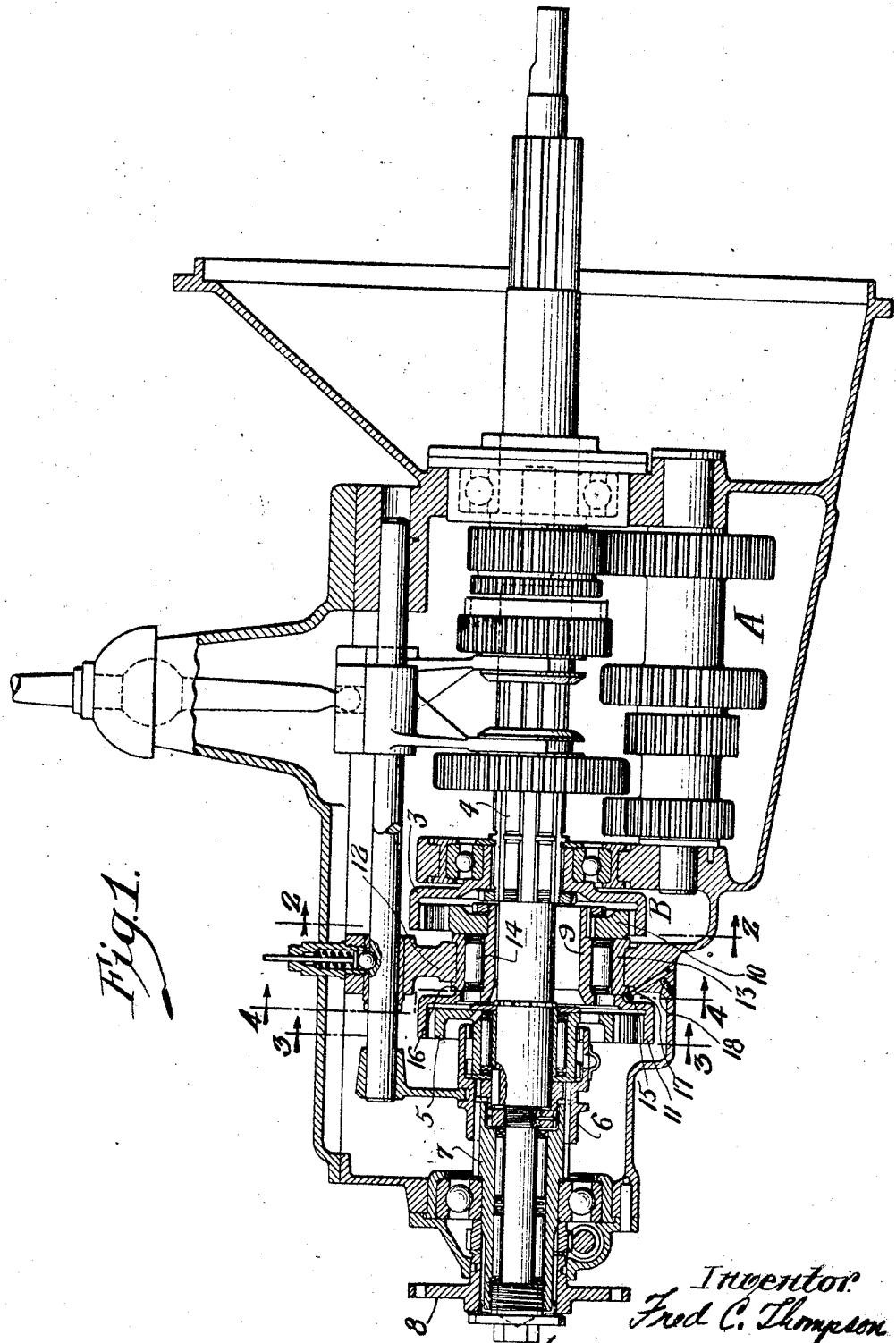

The foregoing together with such other objects as may hereinafter appear or are incident to my invention I obtain by means of a construction which I have illustrated in preferred form, wherein Fig. 1 is a sectional elevation showing my improvement applied to an overspeed automobile transmission.

Figure 2:
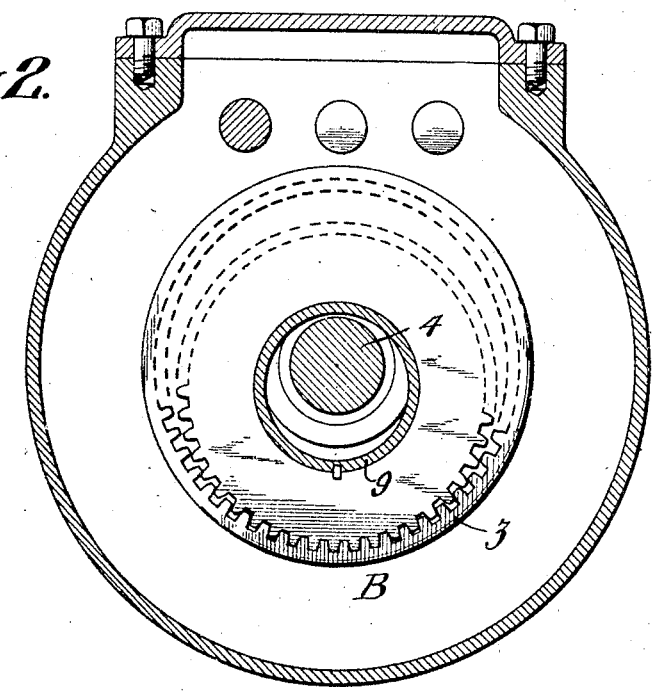
Figure 3:
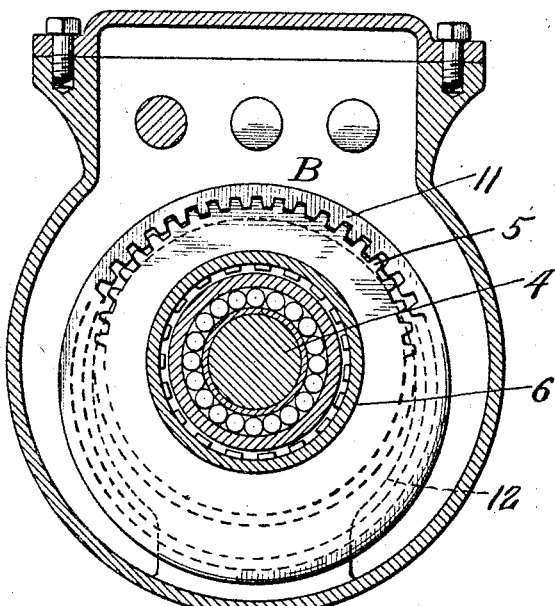

Figs. 2, 3 and 4 are cross sectional views taken on the line 2—2, 3—3 and 4—4 respectively of Fig. 1.

Fig. 5 is an enlarged fragmentary section of a modified form of my invention and Fig. 6 is a cross section taken on the line 6—6 of Fig. 5.

Referring now to Fig. 1 it will be seen that I have shown my invention applied to a change speed device for automobiles of the class disclosed in my copending application, Serial No. 731,715, filed August 13th, 1924. In brief such change speed device comprises a gear box A having the usual selective gearing and an overspeed unit B.

The overspeed unit B comprises in general an internal gear 3 splined to the shaft 4 of the gear box; an external gear 5 adapted to be connected by means of a clutch 6 with the shaft 7 which has a universal coupling member 8 for connection to the propeller shaft of the automobile; and a hollow lay shaft 9 provided with an external gear 10 for mesh with the internal gear 3 and an integral gear 11 for mesh with the external gear 5.

In so far as my improvement is concerned the shaft 4 may be considered as the drive shaft and the shaft 7 as the driven shaft and these shafts will be identified by such terms hereinafter.

The hollow lay shaft 9 is rotatably carried in the bearing 12, in this instance formed integral with the gear case, there being however an eccentric bushing 13 and anti-friction rollers 14 provided between the lay shaft 9 and bearing 12, for the purpose, and of the arrangement, now to be described.

Referring now more particularly to Figs. 1 and 4 it will be seen that the bearing 12 is made in two halves, so that the eccentric bushing 13 may be readily mounted in place, such bushing having flanges at its edges to prevent displacement.

In order to simplify the machine work and to ensure proper and effective mesh of the internal gears and pinions I have provided the eccentric bushing 13 which may be rotated in the bearing 12 to change the relation of the lay shaft center to the drive and driven shaft center. By this means I am enabled to bring the meshing gears into effective mesh in a very simple manner even if the bearing 12 were inaccurately machined, thus avoiding the necessity of the very accurate machining heretofore required. Further in this connection it will be seen that my invention is not only useful when the gears do not mesh properly in the first instance, that is to say, when initially assembled, but also after the gears wear in service. In the particular form of change speed device shown it will be seen that by adjustment of the single eccentric 13 the gears 3 and 10, and also the gears 5 and 11 are brought into proper mesh.

The adjustment of the eccentric is preferably made from the outside of the casing or enclosing structure as by means of a bevel pinion 15 which meshes with bevel teeth 16 provided on the eccentric bushing 13. The bevel pinion 15 is provided with a shank 17 easily accessible for rotating the pinion to make the desired adjustment. Suitable locking means is provided for holding the bushing in its adjusted position as for instance the set screw 18 shown in Fig. 1.

Figs. 5 and 6 show a modified form of adjusting and locking device comprising a plurality of notches 19 in the flange 20 of the eccentric bushing 13 which may be engaged by a spanner wrench or other suitable tool for rotating the bushing, a clip 21 being provided for locking the bushing in adjusted position.

While I have shown my invention applied to an overspeed device used in connection with the usual automobile selective transmission device it is to be understood that the advantages which can be realized therethrough may be had in many other forms of transmission gearing.

No specific claim is made herein to the construction of the overspeed unit B per se as claims directed thereto are part of the subject matter of my copending application, Serial No. 731,715, filed August 13, 1924.

I claim:—

1. In a change speed device the combination of a shaft having an internal gear thereon; a second shaft having an external gear thereon; a lay shaft having an external and internal gear thereon meshing with the aforesaid internal and external gears respectively; a casing, a bearing in the casing for the lay shaft; a movable eccentric sleeve in said bearing and means for moving said eccentric sleeve, said means being accessible from outside the casing.

2. A change speed device comprising, in combination, a case, a plurality of bearings, a driving shaft, a coaxial driven shaft, a driving gear mounted on said driving shaft, a hollow lay shaft through the bore of which the axis of the aforesaid shafts passes, a fixed bearing for the hollow shaft the axis of which is offset to that of the driving and driven shafts, gears mounted on the hollow lay shaft, a gear coaxially mounted with the driving and driven shafts and spaced from the driving gear, the gears on the hollow shaft being adapted to mesh with the driving and coaxial gears, and a movable sleeve mounted in said bearing whereby effective mesh of the aforesaid gears may be ensured, and means for adjusting said sleeve, said means being accessible from outside the casing.

In testimony whereof, I have hereunto signed my name.

FRED C. THOMPSON.